Patented Mar. 6, 1923.

1,447,528

UNITED STATES PATENT OFFICE.

JOHANNES THEODORUS BOUWMAN, OF THE HAGUE, NETHERLANDS, ASSIGNOR TO NAAMLOOZE VENNOOTSCHAP "AGO" MAATSCHAPPIJ VOOR HET DROGEN, VERWERKEN EN VEREDELEN VAN HOUT, OF THE HAGUE, NETHERLANDS, A CORPORATION OF THE NETHERLANDS.

PROCESS FOR DYEING OR COLORING WOOD AND LIKE FIBROUS MATERIAL UNDER PRESSURE.

No Drawing.    Application filed November 27, 1922.    Serial No. 603,654.

*To all whom it may concern:*

Be it known that I, JOHANNES THEODORUS BOUWMAN, technical engineer, residing at The Hague, the Netherlands, have invented certain new and useful Improvements in a Process for Dyeing or Coloring Wood and like Fibrous Material Under Pressure, of which the following is a specification.

The invention relates to a process for dyeing or coloring wood and like fibrous material in such a way that it obtains the same color throughout the whole mass.

Processes are known whereby the desired color is infused in the wood throughout the whole mass after it has been dried as completely as possible, by forcing the dye into the wood under pressure. With this method one obtains pretty good results when the wood thus impregnated is worked without further treatment into knives, door-handles and other objects for use. This known dyeing process however is quite inadequate when the wood after dyeing is subjected to a pressure working from all sides, e. g., by immersing it in asphalt or some other thick liquid and exposing it to a high pressure of e. g. 200 atm. at a temperature above 100° C. in order to give a greater compactness to the wood. When this known compression-process follows the dyeing operation, the dye by which the wood or like fibrous material is impregnated is driven out of the cells again.

Now according to the process of the invention it is possible to fix the dye in such a way in the cells that the wood and like fibrous material retains quite the same color through its whole mass, after its being subjected to the compression process.

The invention consists in immersing the wood or like fibrous material under pressure and after it has been dried, in a dye composed of a mixture of an acid dye and a basic dye dissolved in a medium such as water, spirit or another solvent, and in such relation that the acid dye is present in excess. As examples of acid dyes which may be used, orange II and ponceau R. R. may be mentioned, while the basic dyes may be for example methylen blue B or methyl violet B. B. extra. Any of the many acid and basic dyes usually listed by dye manufacturers may however be employed.

The degree to which the acid dye is present in excess depends on the kind of wood or other fibrous material which has to be dyed. I have found that the best results were obtained by using a mixture wherein the relation of the quantity of acid dye to the quantity of basic dye was 3:1. The dyes are each separately dissolved in a quantity of water in the relation of 1 part of dye, to 40 parts of water. After immersion under pressure in this mixture, the wood or like fibrous material may be exposed to the above compression process, preferably at normal temperature, at a pressure of 100-300 atm.

It appears that after this compression-operation the dye has fixed itself intimately to the walls of the cells, the wood retaining throughout the whole mass a perfectly uniform color in accordance with the dyes used.

I claim:

1. A process for dyeing or coloring wood and like fibrous material throughout its whole mass, consisting in immersing the wood, after it has been dried, in a dye under pressure, the said dye consisting of an acid and a basic dye dissolved in such a relation that the acid dye is present in excess.

2. A process according to claim 1, characterized by the fact that the relation of the quantity of acid dye to the quantity of basic dye is 3:1.

In testimony whereof I affix my signature.

JOHANNES THEODORUS BOUWMAN.